April 15, 1969  R. L. THURSTON  3,438,416
BOLT ASSEMBLY
Filed May 3, 1967
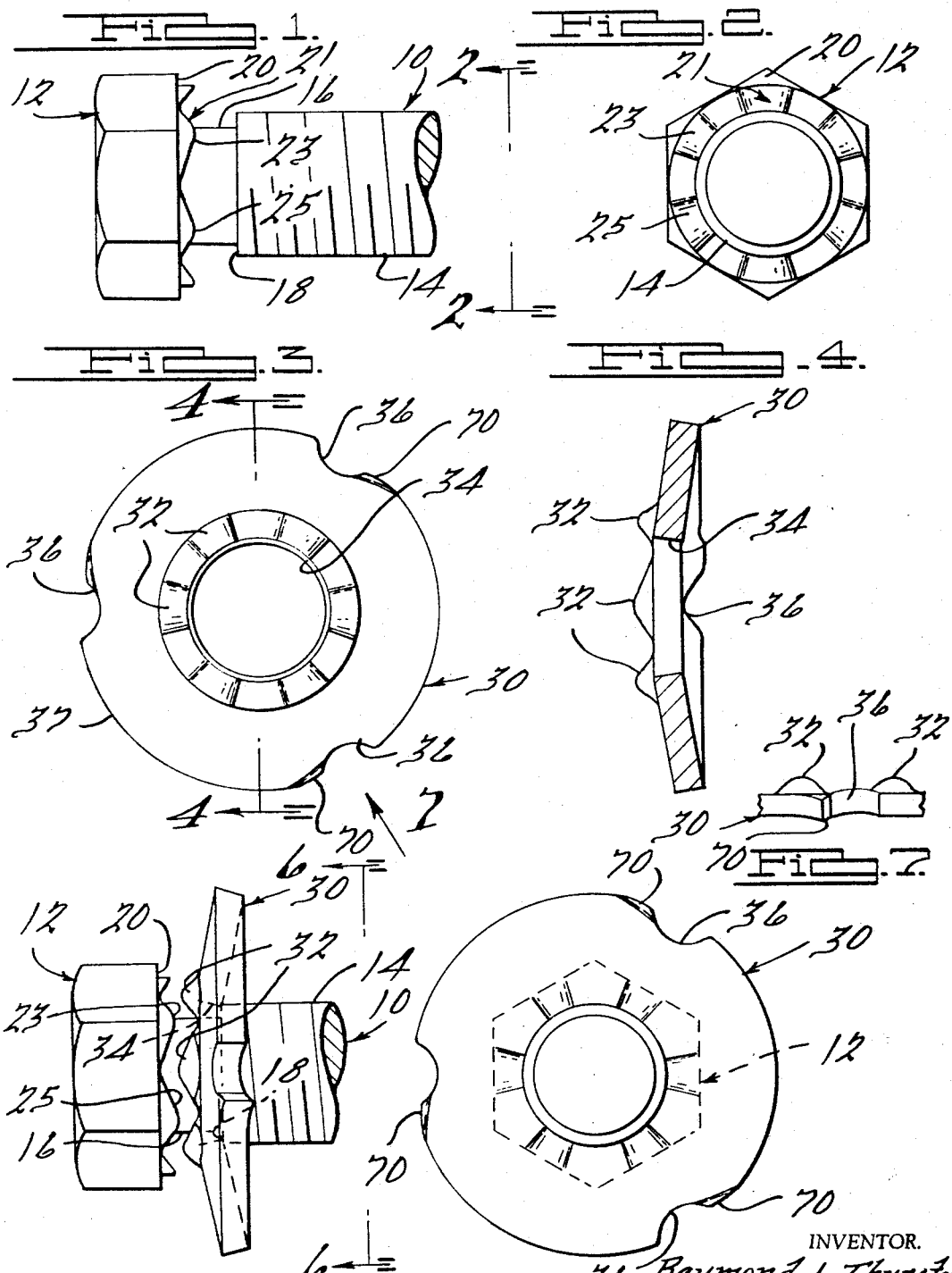
INVENTOR.
Raymond L. Thurston
BY
Harness, Dickey & Pierce
ATTORNEYS.

United States Patent Office 3,438,416
Patented Apr. 15, 1969

3,438,416
BOLT ASSEMBLY
Raymond L. Thurston, Dearborn, Mich., assignor, by mesne assignments, to Vare Corporation, New York, N.Y., a corporation of New York
Filed May 3, 1967, Ser. No. 635,875
Int. Cl. F16b 39/28, 39/26, 39/24
U.S. Cl. 151—37        1 Claim

ABSTRACT OF THE DISCLOSURE

A threaded bolt assembly comprised of a special wave formed washer, a bolt head having on its underside a waved lobed surface for contact with the washer, and cut-out portions on the periphery of the washer including bent finger projetcions having a tendency to bite into the base material when the fastener type bolt assembly is attempted to be loosened.

Background of the invention

This invention broadly relates to a bolt assembly, including a wave formed washer adapted to mate with the bolt head having a waved lobed underside surface, with the washer including cut-away portions on its periphery forming bent finger projections on the bottom side of the washer which contact the base material, to thereby provide a fastener which has the effect of increasing the clamping load when the bolt assembly is attempted to be loosened.

In the past bolt assemblies have been known wherein mating surfaces are provided on the underside of the bolt head and on the washers which contact said underside, such that relative rotation between the washer and the bolt head is restricted in an attempt to improve the locking action provided by the washer. Such bolt assemblies are shown, for example, in the following U.S. Patents Nos. 2,251,560, 2,783,810, 2,948,326, and 2,228,284. However, such bolt assemblies have all been deficient for many aspects in that all fastening action which they have provided did not sufficiently increase the amount of torque required to loosen the assemblies from the base material to which they were attached.

Accordingly, it is an object of the present invention to provide an improved bolt assembly.

Another object of the present invention is to provide an improved bolt assembly or fastener wherein the torque required to remove the bolt assembly after it has been fastened in place approaches the torque used to install the bolt assembly in its fastened relationship to a base material.

Another and more specific object of the present invention is to provide an improved expanding bolt assembly comprised of a threaded bolt, a wave formed washer including cut-out areas on the periphery of the washer, and bent finger projections formed in proximity to the cut-out areas of the washer, as well as a waved lobed surface on the underside of the head of the bolt which mates with said wave-formed washer.

Other objects, features and advantages of the present invention will become aparent from the subsequent description and the appended claims taken in conjunction with the accompanying drawings wherein like numerals indicate like elements.

Brief description of the drawings

FIGURE 1 illustrates a threaded bolt having a waved lobed surface on the underside of the bolt head;

FIGURE 2 is a view along the line 2—2 of FIG. 1;

FIGURE 3 is an elevational view of a wave-formed washer with cut-out portions on its periphery;

FIGURE 4 is a view along the line 4—4 of FIG. 3;

FIGURE 5 illustrates the bolt assembly in accordance with the invention with the washer of FIG. 3 in place on the bolt of FIG. 1;

FIGURE 6 is a view along the line 6—6 of FIG. 5, and

FIGURE 7 is a view in the direction of arrow 7 in FIG. 3 illustrating a bent finger projection which is formed on the leading edge, in this case the left side, of each cut-out portion of the washer.

Summary of the invention

Broadly stated, the present invention is comprised of a bolt assembly comprising a bolt with threads thereon to allow fastening of the assembly to a female member, a bolt head, an underside surface on said bolt head, a plurality of first wave projections on said underside surface, said first projections having a maximum height not greater than about one full pitch dimension measured on said threads, and a minimum height not less than about one-half said full pitch dimension, a washer disposed on said bolt generally adjacent said underside surface, a plurality of second wave projections on said washer which mate with said first wave projections when the assembly is tightened by screw-down of the threads to thereby bring said washer and underside surface into contact, said second projections having a maximum height not greater than about one full pitch dimension measured on said threads and a minimum height not less than about one-half said full pitch dimension, a plurality of recesses generally disposed peripherally on said washer, and biting type projections on at least some of said recesses adapted to make biting contact with a base material, to which the assembly is fastened, to thereby resist loosening of the assembly.

Detailed description

FIGURES 1 and 2 show a bolt generally designated 10 and bolt head designated 12 for use in accordance with the inventon. The bolt has threads 14 thereon, which may for example, have a thread size of 8/32, 10/24, 10/32, etc., varying in extent to a thread size such as ½-13 or ½-20. Preferably and as shown the bolt may also have a recessed neck portion 16 at the top thereof forming the space between the shoulder 18 at the end of the threads and the underside surface 20 of the bolt head. The underside surface 20 of the bolt head 12 includes disposed thereon a waved lobed surface designated 21 and containing a plurality of raised lobes such as 23 and 25.

FIGURES 3 and 4 illustrate the wave-formed washer generally designated 30 which may, for example, be formed in a stamping operation, or the like. The wave-formed washer 30 has a plurality of raised lobe or hump like members 32 which mate with the waved lobed surface 21 on the underside 20 of the bolt head 12. The mating takes place when the washer 30 is in position on the neck 16 of the bolt, being disposed thereabout in a lose fit provided by the aperture 34, which is of such a diameter to give said loose fit. As shown most clearly in FIGURE 3, there are three cut-away portions or areas formed on the washer 30 during the stamping operation or the like. For example, while three of said cut-away areas designated 36 are shown in FIGURE 3, there of course may be any number disposed about the periphery 37 of the washer 30.

FIGURE 7 illustrates that a bent finger projection designated 70 is formed at the leading edge of the cut-away area 36, as viewed in the direction of arrow 7 from FIGURE 3. By the terminology leading edge it is meant that the bent finger projection 70, as shown in FIGURE 7 is on that edge of the washer formed by the cut-away area which would bring the bent finger projection into biting contact with the base material against which the washer 30 is clamped when the bolt assembly of the invention is rotated in a direction to loosen same from a fastened position. In other words, if a turn of counter clockwise rotation removes the bolt assembly from a fastened position, then the bent finger projection would be on the left hand side of the cut-away portion 36, as viewed from the direction of arrow 7 in FIGURE 3, and vice versa, if a clockwise rotation is required to remove the bolt assembly from a fastened position then the bent finger projection would be on the right side as viewed in FIG. 7. The effect of the bent finger projection is to provide the bolt assembly with a biting action against the base material to which the bolt assembly is fastened when torque action is applied in an attempt to loosen the assembly from the base material.

FIGURES 5 and 6 show the bolt and washer in accordance with the invention in assembled form with like numerals indicating like elments. From these figures it can be seen that a male-female locking action takes place when the raised lobes 23 and 25 make intermeshing contact with corresponding mating raised surfaces 32 on the washer 30. A loose fit between the washer and the neck portion 16 of the bolt is shown at the aperture 34 in FIGURE 5. This loose fit enables the washer 30 to slide to the left or right as shown in FIGURE 5 and thereby make contact with the shoulder 18 of the bolt 10 when the washer is in a position fully removed from the underside surface 20 of the bolt head 12. It will also be understood that when the bolt assembly as shown in FIGURES 5 and 6 is screwed into threaded contact with a base material that the washer 30 will then be brought into contact with the underside surface 20 of the bolt head such that the raised wave surfaces 32 are brought into mating contact with the lobes 23, 25 on the surface 21 on the bolt head 12.

The height of the lobes or waves 23, 25 on the underside surface 20 of the bolt head, and the corresponding raised humps or waves 32 on the washer has unexpectedly been discovered to be important to successful practice of the invention. Broadly stated, the height of these projections should be of a maximum dimension which approximately equals that dimension as measured by one full pitch of the thread being used on the bolt (i.e., by one full pitch is meant the longitudinal distance measured between the high point of two adjacent threads), and the minimum dimension for said height should not be less than approximately one-half a full pitch measured on the thread being used.

Mating contact between the washer 30 and the surface 21 of the bolt head 12, upon threaded tightening of the bolt assembly, prevents relative rotation between the washer 30 and the bolt 10. At the same time, as the bolt is fastened into a tight position, the washer 30 is slightly deformed or depressed such that it is put under stress and the bent finger projections 70 are strongly urged or pressed into biting contact with the base material. Upon attempted loosening, whether unintentional or intentional, of the bolt assembly from the base material, the bolt head is prevented from moving relative to the washer 30 due to the mating contact between the lobes 23, 25 on the underside surface 20 of the bolt head 12, and the raised wave surfaces 32 in contact therewith on the washer 30. In addition to the restrained relative movement between the bolt head and washer, the bent finger projections 70 which are in biting contact with the base material are strongly resistant to rotation of the washer 30 relative to the base material and hence the resistance of the bolt assembly to loosening is markedly high.

The advantages of this invention as described hereinabove are considered fairly apparent. In more particularity, however, a primary advantage of this invention is that the fastener or bolt assembly herein described works extremely well when utilized for high temperature variation clamping assemblies, and by this it is meant, for example, exhaust manifold bolting of vehicles. Actual test results have indicated that the bolt assembly described herein withstands large temperature variations while at the same time keeping the manifold secure on the engine block of a Ford 289 cubic inch engine. In addition, the fastener or bolt assembly of this engine has been discovered to result in markedly higher break-away torque compared to currently manufactured fastener parts. Moreover, the bolt assembly herein is uniquely advantageous as a fastener for use on applications where extreme temperature variations exist and where a bolt assembly is subject to vibration and possible loosening.

While it will be apparent that the preferred embodiments of the invention disclosed are well calculated to fulfill the objects above stated, it will be appreciated that the invention is susceptible to modification, variation and change.

What is claimed is:
1. A bolt assembly comprising
 a bolt with threads thereon to allow fastening of the assembly to a female member,
 a bolt head,
 and an underside surface on said bolt head a plurality of first wave projections on said underside surface,
 said first projections having a maximum height not greater than about one full pitch dimension measured on said threads and a minimum height not less than about one-half said full pitch dimension,
 a reduced diameter neck portion generally disposed between said bolt head and said threads
 a washer disposed on said bolt generally adjacent said underside surface,
  a corresponding numerical plurality of second wave projections on said washer which mate with said first wave projections when the assembly is tightened by screwdown of the threads to thereby bring said washer and the underside surface into contact,
  said second projections having a maximum height not greater than about on full pitch dimension measured on said threads and a minimum height not less than about one-half said full pitch dimension,
  said washer being held in position by said reduced diameter neck portion prior to usage of the assembly,
 a plurality of recesses generally disposed peripherally on said washer, and
 biting type projections on at least some of said recesses adapted to make biting contact with a base material, to which the assembly is fastened, to thereby resist loosening of the assembly.

References Cited
UNITED STATES PATENTS

| | | | |
|---|---|---|---|
| 843,720 | 2/1907 | Waddell et al. | 151—35 |
| 533,909 | 2/1895 | Matter | 151—41 |
| 1,406,423 | 2/1922 | Smith | 151—41 |
| 2,278,062 | 3/1942 | De Koharovich | 151—38 |
| 2,498,221 | 2/1950 | Poupitch | 151—38 |
| 3,352,344 | 11/1967 | Lanius | 151—35 |

CARL W. TOMLIN, *Primary Examiner.*

RAMON S. BRITTS, *Assistant Examiner.*

U.S. Cl. X.R.

151—41